April 26, 1955     D. WILLIAMS, SR     2,707,126
BAIT HOLDER
Filed Aug. 7, 1950

INVENTOR.
DAVID WILLIAMS, SR.

BY Wm. H. Dean
AGENT

United States Patent Office 2,707,126
Patented Apr. 26, 1955

2,707,126

BAIT HOLDER

David Williams, Sr., San Diego, Calif.

Application August 7, 1950, Serial No. 178,113

2 Claims. (Cl. 294—106)

My invention relates to a bait holder, more particularly for use by fishermen in placing bait on fishing hooks, and the objects of my invention are:

First, to provide a bait holder of this class which may be used in grasping the bait during the insertion of the hook therein, whereby a fisherman need not soil his hands in placing the bait on the hook;

Second, to provide a bait holder of this class having novel bait grasping levers, one of which is provided with side plates extending at opposite sides of the opposed lever, which confines the bait, preventing it from being displaced from the location between the gripping portions of the levers;

Third, to provide a bait holder of this class which is adapted to initially pick up and grasp the bait for removing the same from a bait box or the like;

Fourth, to provide a bait holder of this class which may be adjusted to certain critical dimensions which prevents the injury of the bait when held therein;

Fifth, to provide a bait holder of this class which is very simple and easy to operate;

Sixth, to provide a bait holder of this class which will handle a large variety of bait; and Seventh, to provide a bait holder of this class which is very simple and economical of construction, efficient in operation, which will not readily deteriorate or get out of order.

Figure 1:
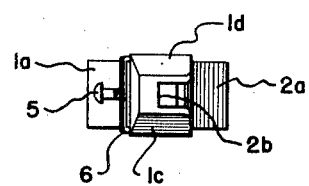
Figure 3:
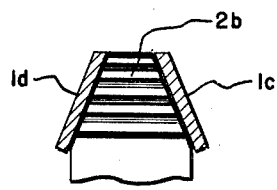
Figure 2:
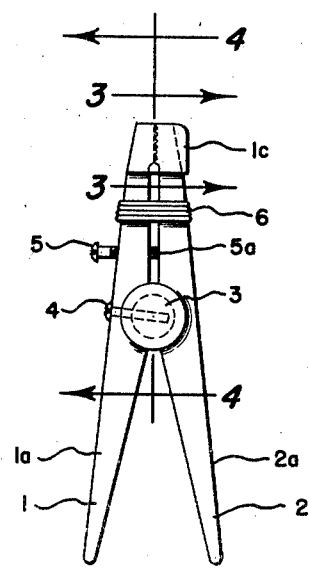

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, forming a part of this application, in which:

Fig. 1 is an end elevational view of my bait holder; Fig. 2 is a side elevational view thereof; Fig. 3 is an enlarged fragmentary sectional view, taken from the line 3—3 of Fig. 2; and Fig. 4 is an enlarged fragmentary sectional view, taken from the line 4—4 of Fig. 2.

Similar characters of reference refer to similar parts and portions throughout the several views of the drawings.

The levers 1 and 2 are pivotally mounted in opposed relationship to each other on the fulcrum member 3, which is a circular in cross-section member, as shown in Fig. 2 of the drawings. These levers 1 and 2 are provided with finger-engaging portions 1a and 2a, and are surrounded by the resilient member 6, which is a plurality of convolutions of rubber or other suitable resilient material.

Figure 4:
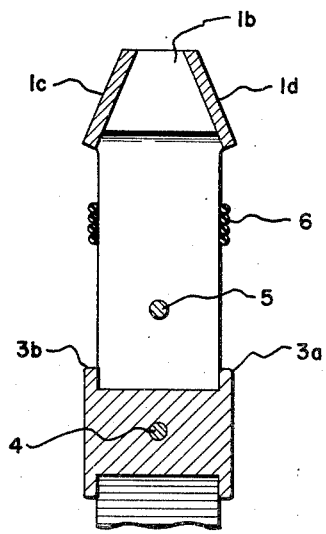

At the opposite ends of the levers 1 and 2 from the finger-engaging portions 1a and 2a are the bait grasping nib portions 1b and 2b, shown in Figs. 3 and 4, respectively, in detail. Fixed to the lever 1, at opposite sides of the bait grasping nib portion 1b, are the side plates 1c and 1d, which straddle opposite sides of the bait grasping nib portion 2b, as shown best in Fig. 4 of the drawings. The bait grasping nib portion 2b is serrated in order to provide a secure engagement with the bait when positioned between the side plates 1c and 1d.

The screw 4 is secured in the lever 1 and is screw-threaded into the fulcrum member 3 in order to prevent loss thereof when the levers 1 and 2 are disassembled. The screw 5 is screw-threaded in the lever 1 and engages the inner side of the lever 2 at its end 5a, while the resilient character of the resilient member 6 tends to force the bait-engaging nibs 1b and 2b together, as shown in Fig. 2 of the drawings. The fulcrum member 3 is circular in cross-section and is provided with flanges 3a and 3b, on opposite ends thereof, for lateral location of the levers 1 and 2 relative to each other.

The operation of my bait holder is substantially as follows:

When it is desired to grasp bait such as an angleworm or the like, between the bait-holding nibs 1b and 2b, the finger-engaging portions 1a and 2a are compressed together against tension of the resilient member 6, until the nib 2b is disposed outwardly of the ends of the side plates 1c and 1d, permitting one of the side plates to be engaged with a worm or the like for forcing the same intermediate the side plates 1c and 1d, whereupon the finger portions 1a and 2a are released, permitting the resilient member 6 to close the nibs 1b and 2b, grasping the worm intermediate the side plates 1c and 1d, for holding the same, while the fishing hook is inserted therein.

Thus, the fisherman need not touch the bait with his hands, due to the ability of the side plates 1c and 1d to confine the bait intermediate the nibs 1b and 2b, for holding said bait and initially engaging the same and removing bait from bait boxes or the like.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a bait holder, a pair of levers, a pivotal connection intermediate the ends of said levers for mounting the levers in opposed relationship to each other, each of said levers having a bait engaging nib at one end thereof, each of said nibs having a blunt end and straight sides tapering toward and extending to said blunt ends, and opposed side plates on one of said nibs extending to the blunt end thereof and extending in overlapping relationship with the other of said nibs when the nibs are closed together, said plates being inclined toward each other and toward the blunt end of said one nib, both of said plates being inclined to the longitudinal axis of the holder, whereby bait may be picked up by said side plates when the holder is manually held inclined to a flat surface on which the bait is resting and held between said nibs without injuring the bait.

2. In a bait holder, a pair of levers, a pivotal connection intermediate the ends of said levers for mounting the levers in opposed relationship to each other, each of said levers having a bait engaging nib at one end thereof, resilient means urging movement of said nibs toward each other, stop means limiting said movement, each of said nibs having a blunt end and straight sides tapering toward and extending to said blunt ends, opposed side plates on one of said nibs extending to the blunt end thereof and extending in overlapping relationship with the other of said nibs when the nibs are closed together, said plates being inclined toward each other and toward the blunt end of said one nib, both of said plates being inclined to the longitudinal axis of the holder, and said side plates having bevelled edge portions remote from the juncture of the side plates with said lever to facilitate entry of the bait between the plates, whereby bait may be picked up by said side plates when the holder is manually held inclined to a flat surface on which the bait is resting and held between said nibs without injuring the bait.

References Cited in the file of this patent

UNITED STATES PATENTS

| 57,977 | Sanborn | Sept. 11, 1866 |
| 104,720 | Farrington | June 28, 1870 |
| 758,504 | Bolding | Apr. 26, 1904 |
| 1,445,348 | Noble | Feb. 13, 1923 |
| 1,452,372 | Gomez | Apr. 17, 1923 |
| 1,610,925 | Bryan | Dec. 14, 1926 |
| 1,745,411 | Fay | Feb. 4, 1930 |